(12) United States Patent
Hagen et al.

(10) Patent No.: US 11,009,164 B2
(45) Date of Patent: May 18, 2021

(54) TOOTH DISK HAVING MULTI-WEB HOLDING TEETH

(71) Applicant: VOSS AUTOMOTIVE GMBH, Wipperfürth (DE)

(72) Inventors: Harald Hagen, Wipperfürth (DE); Markus Frangenberg, Lindlar (DE); Lukas Röhrig, Marienheide (DE); Markus Waschkewitz, Bergneustadt (DE)

(73) Assignee: VOSS Automotive GmbH, Wipperfurth (DE)

( * ) Notice: Subject to any disclaimer, the term of this patent is extended or adjusted under 35 U.S.C. 154(b) by 402 days.

(21) Appl. No.: 16/065,666

(22) PCT Filed: Dec. 20, 2016

(86) PCT No.: PCT/EP2016/081828
§ 371 (c)(1),
(2) Date: Jun. 22, 2018

(87) PCT Pub. No.: WO2017/108730
PCT Pub. Date: Jun. 29, 2017

(65) Prior Publication Data
US 2018/0372253 A1 Dec. 27, 2018

(30) Foreign Application Priority Data
Dec. 23, 2015 (DE) .................. 10 2015 122 766.5

(51) Int. Cl.
*F16L 37/091* (2006.01)
(52) U.S. Cl.
CPC ......... *F16L 37/0915* (2016.05); *F16L 37/091* (2013.01)
(58) Field of Classification Search
CPC .................................................. F16L 37/091
(Continued)

(56) References Cited

U.S. PATENT DOCUMENTS 3,204,988 A * 9/1965 Dunton ................. F16L 37/091
285/40
4,084,843 A * 4/1978 Gassert ................. F16L 37/091
285/105
(Continued)

FOREIGN PATENT DOCUMENTS

DE 9103328 U1 6/1991
DE 20017921 A1 2/2002
(Continued)

*Primary Examiner* — David Bochna
(74) *Attorney, Agent, or Firm* — Eric J. Sosenko; Jonathan P. O'Brien; Honigman LLP

(57) ABSTRACT

A toothed disk for fastening a feedthrough-plug-connected media line. The toothed disk includes a circular insertion opening that is defined at a periphery of the insertion opening by elastic holding teeth, separated from each other by respective slots. In the axial direction, the holding teeth extend at an angle to a longitudinal axis that is perpendicular the plane of the insertion opening. Each holding tooth is connected to an outer mounting section by at least one connecting web. Punch-outs are formed between the connecting webs. A mounting section is arranged on a peripheral circle around the insertion opening and lies in a plane parallel to the plane of the insertion opening. Each holding tooth is connected to the mounting section by at least two connecting webs. Also provided is a connection assembly for the feedthrough plug connection of a media line including the toothed disk.

27 Claims, 10 Drawing Sheets

(58) Field of Classification Search
USPC .......................................................... 285/340
See application file for complete search history.

(56) References Cited

U.S. PATENT DOCUMENTS

| | | | | |
|---|---|---|---|---|
| 5,553,901 A | * | 9/1996 | Serot | ........................ F16L 19/12 |
| | | | | 285/322 |
| 2002/0140226 A1 | | 10/2002 | Salomon-Bahls | |
| 2005/0104367 A1 | * | 5/2005 | Le Quere | .............. F16L 37/091 |
| | | | | 285/18 |
| 2005/0173922 A1 | * | 8/2005 | Coquard | ............. F16L 37/0915 |
| | | | | 285/308 |
| 2006/0232067 A1 | * | 10/2006 | Kwak | .................... F16L 37/091 |
| | | | | 285/354 |
| 2010/0045032 A1 | | 2/2010 | Rea | |

FOREIGN PATENT DOCUMENTS

| | | |
|---|---|---|
| DE | 10162658 A1 | 7/2003 |
| EP | 0631081 A1 | 12/1994 |
| EP | 1561989 B1 | 8/2005 |
| JP | S522320 | 11/1976 |
| JP | 2007170501 A | 7/2007 |
| WO | 2005/024283 A1 | 3/2005 |

\* cited by examiner

TOOTH DISK HAVING MULTI-WEB HOLDING TEETH

BACKGROUND

1. Field of the Invention

The present invention relates to a toothed disk for fastening a feedthrough plug-connected media line having a circular insertion opening, wherein at a periphery of the insertion opening, arranged elastic holding teeth, separated from each other by respective slots, form an inner holding section, wherein in the axial direction, the holding teeth extend at an angle to a longitudinal axis extending perpendicularly to the circle plane through a center point of the insertion opening in such a way that the holding teeth include an obtuse angle at their side surface facing away from the insertion opening, and with a mounting section, wherein each holding tooth is connected to the outer mounting section by means of at least one connecting web, wherein punch-outs are formed between the connecting webs, and wherein the mounting section is arranged on a peripheral circle around the insertion opening and lies in a mounting plane which extends parallel to the circle plane spanned by the insertion opening.

2. Description of Related Art

A generic toothed disk of this kind is known from EP 1 561 989 B1. Accordingly, a toothed disk comprises an outer, circular-shaped mounting section on which six connecting webs are arranged radially to the center point, wherein one holding tooth joins to each connecting web along the perimeter. However, in the event that there is a media line passing through the toothed disk, the holding tooth pendulates around the axis of rotation of the connecting web, so that the holding force of the holding tooth is not assured.

SUMMARY

The problem underlying the present invention is to create a toothed disk of the kind described above, as a punched component whose holding teeth feature a good holding function, wherein the toothed disk requires little plugging force for feedthrough of the media line, but wherein a high holding force is assured in case of a load.

To solve the stated problem, a toothed disk embodying the principles of the present invention provides that each holding tooth of the inner holding section is connected to the mounting section by at least two connecting webs. Due to the reduced attachment region between the mounting section and the inner holding section, the connecting webs permit an increased mobility and/or elasticity of the holding teeth. The flexural resistance of the connecting webs acts together with the mobility due to the punch-outs, so that the insertion forces for the media line can be readily adjusted. In addition, a pendulum movement of the holding teeth due to the connecting webs is essentially prevented.

According to one embodiment of the invention, it is particularly preferred that the connecting webs are formed by punch-outs, in particular circular-shaped punch-outs, extending in the perimeter direction. In addition, preferably these punch-outs lie on an arc-shaped center line on a circle concentric to the insertion opening.

Preferably, the holding teeth together have a perimeter wrapping angle of at least 70%, in particular of 75% to 95% of the perimeter of the media line. This wrapping angle increases the holding force of the toothed disk acting on the media line.

One particularly preferred embodiment of the invention provides that the inner holding section features three to six holding teeth. This limited number of up to six holding teeth leads to a high degree of wrapping around the media line by the holding teeth, wherein the number of holding teeth corresponds to the number of slots. Due to the reduced contact area between the holding teeth and the media line, the slots spaced from each other also reduce the insertion force needed for the media line and the holding teeth additionally provide free play when assuming their fastening position at the media line and thus prevent a tilting of the holding teeth. Furthermore, the number of holding teeth increases with increasing outside diameter of the media line. Thus the toothed disk for a media line with an outside diameter of 4.0 or 6.0 mm, has preferably three to five holding teeth. For a media line with an outside diameter of 8.0 or 10.0 mm, the toothed disk features preferably four to six holding teeth, and for a media line with an outside diameter of 12.0 mm, the toothed disk comprises, for example, five or six holding teeth.

According to one preferred embodiment of the invention, each of the holding teeth features a middle section which is disposed between the connecting webs, and perimeter sections which protrude in an extension of the middle section to the side above the connecting webs and end at the slots. The perimeter width of the middle sections and/or edge sections is dimensioned such that it is defined proceeding from a center line of the connecting webs. Preferably the width of the edge sections amounts to one-sixth to one-fourth, preferably one-fifth, of the total width of the holding teeth. The perimeter width of the middle sections amounts to four-sixths up to two-fourths, preferably three-fifths, of the total width of the holding teeth. By application of this organization, a uniform distribution of support forces is provided between the connecting webs and the holding sections. Due to the primarily non-central arrangement of the connecting webs in the perimeter region of each holding tooth, a more secure hold of the media line is assured, wherein the holding tooth applies a uniform pressure onto the media line, thus not only centrally on the perimeter to the holding tooth. In addition, the connecting webs not arranged entirely in the edge sections prevent the holding teeth from engaging into the media line solely in the region of the edge sections. It is particularly preferred that the holding teeth are organized into edge section, middle section and edge section as follows:

⅙; ⁴⁄₆; ⅙,
⅕; ⅗; ⅕ or
¼; ²⁄₄; ¼.

Thus in case of an applied load, the perimeter engagement of each holding tooth into the mantle surface of the media line is assured.

One particularly preferred embodiment of the invention provides that each holding tooth is designed such that along the insertion opening there is an end edge of the holding tooth, such that when under load, each end edge penetrates into a corner region of the edge section to such a penetration depth into the media line that each holding tooth with its end edge features at the inserted and fastened media line a single wrapping angle, in which its contact surface with fastening function amounts to between 55° and 105° of a maximum wrapping angle of 360°, wherein the individual wrapping angle decreases with the increasing number of holding teeth. The mentioned contact surface makes it possible to adjust a sufficient holding force by the particular holding tooth for the media line to be fastened.

According to one preferred embodiment of the invention, the mounting section features a radial width of at least two-times up to four-times the material thickness; preferably the radial width amounts to 0.5 mm to 1.0 mm. Also preferably the width of the connecting webs (11) measured in the perimeter direction, for example, amounts to two-times up to three-times the material thickness of the used material of the toothed disk. In addition, the slots feature in particular a width of 0.15 mm to 0.4 mm. In particular for a toothed disk which is designed according to at least one of the prior features, its holding teeth feature a good holding function, wherein the toothed disk requires little plug forces for passing the media line through, but wherein a high holding force is provided in the event of a load.

Furthermore, according to the invention a connecting arrangement is provided for feedthrough plug connecting of a media line. The connecting arrangement comprises a cap screw penetrated by a media line along a feedthrough opening. The cap screw is connected up front in the plug-in direction to a contact bushing and to a receiving tube. In addition, the cap screw features a radial gasket arrangement at its rear end in the insertion direction. Furthermore, a toothed disk is arranged coaxially between the front end (in the insertion direction) of the cap screw and the contact bushing. Basically the toothed disk according to the principles of the present invention can be used with any press-in or plug-in design.

BRIEF DESCRIPTION OF THE DRAWINGS

The invention will be explained in greater detail below based on the design embodiments depicted in the attached drawings. The figures show.

The same parts in the various figures are always denoted by the same reference symbols.

DETAILED DESCRIPTION

With regard to the following description it is noted that tooth disks the principles of the present invention are not limited to the design examples and not to all or a plurality of features of described feature combinations, rather each individual part feature of the/of each design example is also of importance to the subject matter of the invention, even detached from all other part features described in connection therewith, and also in combination with any other particular features of another design example.

Figure 1:
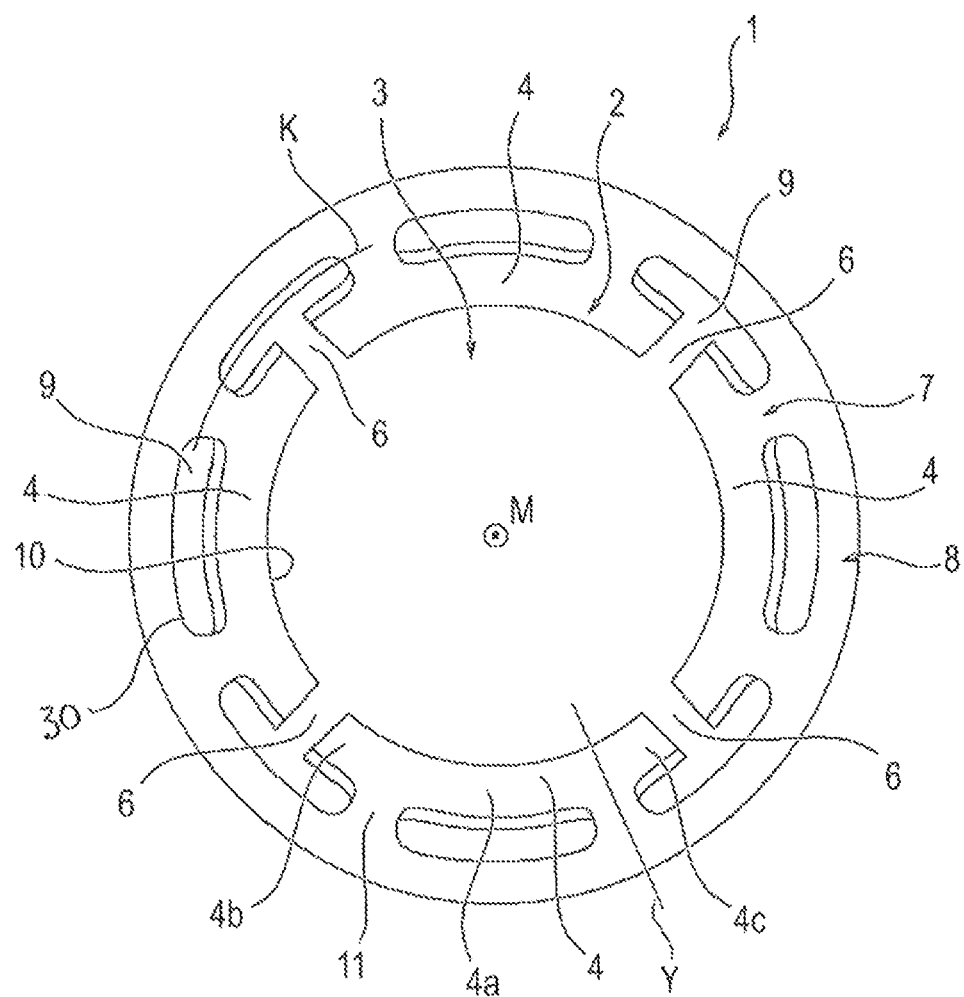
FIG. 1 is a schematic, front view of a toothed disk according to the principles of the present invention.
Figure 2:
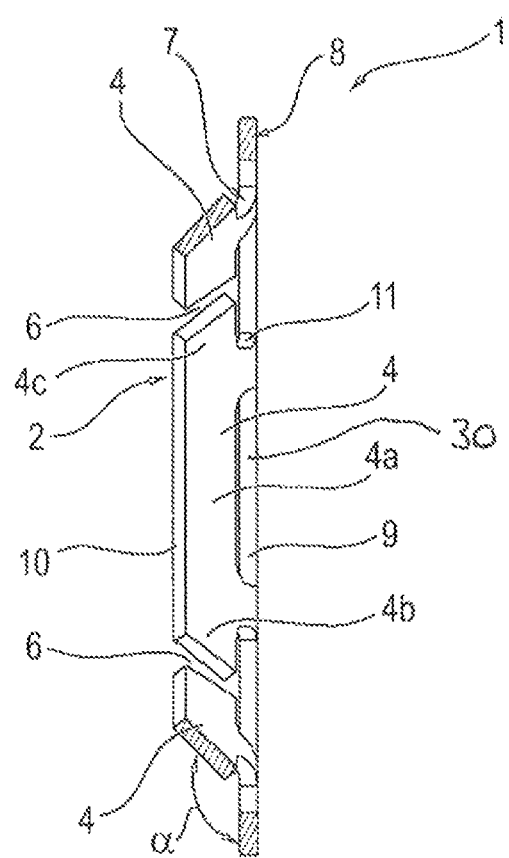
FIG. 2 is a cross-section of the toothed disk according to FIG. 1.

FIGS. 1 and 2 present one embodiment of a toothed disk 1 according to the principles of the present invention.

A toothed disk 1 according to the principles of the present invention features an inner holding section 2 which encompasses a circular-shaped insertion opening 3. The holding section 2 is formed by holding teeth 4 located at a distance from each other and arranged along the perimeter of the insertion opening 3. These holding teeth 4 are designed to be radially elastic and are separated from each other by slots 6. The holding section 2 is connected to an outer positioned mounting section 8 by means of an intermediate section 7. The intermediate section 7 and the mounting section 8 are each arranged on a perimeter circle around the insertion opening. In this case the mounting section 8 lies in a planar mounting plane which extends in parallel to the circle plane spanned by the insertion opening 3. In the axial direction, the holding teeth 4 extend at an angle to a longitudinal axis extending perpendicularly to the circle plane through a center point M of the insertion opening 3 in such a way that the side surface of the holding teeth facing away from the insertion opening 3 includes an obtuse angle $\alpha$ together with a mounting section 8. This obtuse angle $\alpha$ amounts to 120° to 150°, preferably 130° to 140°. The bending of the holding teeth 4 takes place in particular in the region of the intermediate section 7.

According to the invention and as depicted in FIG. 1, the individual holding teeth 4 are not connected across their entire perimeter width to the mounting section 8, but rather by at least two connecting webs 11 which form the intermediate section 7. These connecting webs 11 are formed by circular-shaped punch-outs 9 which lie on a circle that extends concentric to the insertion opening 3. The width of the connecting webs 11 measured in the perimeter direction amounts in particular to two-times up to three-times the material thickness of the used material of the toothed disk 1.

The mounting section 8 is designed in particular as an enclosed ring. This means that the mounting section 8 wraps around the center point M of the insertion opening 3 across an angle of 360°. A mounting section 8 designed as an enclosed ring has the advantage that the mounting section 8 cannot be displaced radially outward from the center point M, that is, in a direction pointing away from the center point M. Thus, more mounting positions for the toothed disk 1 are possible. It is particularly preferred to design the mounting section 8 as circular, which has the advantage of further reducing any outward displacement of the toothed disk 1.

In particular, every holding tooth 4 features a punch-out 9 enclosed around the perimeter. Preferably an edge 30 formed on the toothed disk 1 fully wraps around the perimeter of the enclosed punch-out 9 by an angle of 360°. This means that the punch-out 9 enclosed around the perimeter is not connected to a slot 6. Thus, due to the holding teeth 4, a uniform holding force is exerted onto a mantle of an enclosed media line 16.

The edge 30 enclosing the punch-out 9 along the perimeter over an angle of 360° is formed preferably at the holding tooth 4, at the two connecting webs 11 and at the mounting section 8.

The toothed disk 1 according to the invention is designed as a flexible punched part and consists of elastic material, in particular of a spring steel. The spring-elastic material has preferably a material thickness of 0.1 mm to 0.4 mm, in particular of 0.2 mm to 0.25 mm. The holding teeth 4 are produced in a punch-bend process. This expands the slots 6 present between the holding teeth 4 from outside to inside, that is, toward the insertion opening 3. The slots 6 are produced by removal of material and have a width of 0.15 mm to 0.4 mm. The insertion opening 3 in the punched state, before bending of the holding teeth 4, has a diameter which is in particular 5% to 15% smaller than an outer diameter of the media line 16 passing through the insertion opening 3, on which the the toothed disk 1 is arranged in a friction fit in the inserted state, and in a "friction-form fit" when under load. After the bending of the holding teeth 4, the insertion opening 3 has a diameter that is smaller than the outside diameter of the media line 16 and in particular is 2% to 10% larger than the diameter of the insertion opening 3 before bending of the holding teeth 4. The outside diameter of one such media line 16—see FIG. 5—preferably amounts to 4.0 mm, 6.0 mm, 8.0 mm, 10 mm or 12 mm. The toothed disk 1 at the preferred media line sizes of 4.0 mm, 6.0 mm or 8.0 mm has an outside diameter in the same sequence of preferably 6.8 mm, 8.6 mm or 10.8 mm. The inside diameter of the insertion opening 3 after the bending process of the holding teeth 4 at the above media line sizes according to the stated sequence amounts in particular to 3.5 mm, 5.4 mm or 7.3 mm. The wall thickness of the media line for the aforementioned media line sizes each amounts to 1 mm, for example.

The mounting section 8 features a radial width of preferably at least two times to four times the material thickness, and preferably amounts to 0.5 mm to 1.0 mm.

Accordingly the holding sections 4 of the toothed disk 1 rest with their end edges 10 on a circle whose diameter is smaller than the outside diameter of a media line 16 inserted into the insertion opening 3.

FIGS. 1 and 2 depict one exemplary embodiment in which equal size holding teeth 4 are formed on the perimeter of the insertion opening 3. These holding teeth 4 together feature a perimeter wrapping angle which is composed from the sum of the individual wrapping angles of the holding teeth 4, and amounts to at least 70%, preferably 75% to 95% of a maximum wrapping angle of 360°. Due to the large wrapping angle, a large holding area is obtained for the media line.

In the exemplary embodiment according to FIG. 1, four holding teeth 4 are depicted. But likewise it can be expedient to provide three to six holding teeth 4 on the toothed disk 1. The number of holding teeth 4 increases with increasing outside diameter of the media line 16. The toothed disk 1 for a media line 16 with an outside diameter of 4.0 or 6.0 mm has preferably three to five holding teeth. For a media line 16 with an outside diameter of 8.0 or 10.0 mm, the toothed disk 1 features preferably four to six holding teeth 4, and for a media line 16 with an outside diameter of 12.0 mm, the toothed disk 1 comprises, for example, five or six holding teeth 4.

Each of the holding teeth 4 features a middle section 4a which is disposed between the connecting webs 11, and edge sections 4b, 4c which extend from the middle section 4a to the side beyond the connecting webs 11 and end at the slots 6. The perimeter width of the middle sections 4a and/or edge sections 4b, 4c is dimensioned preferably such that it is defined proceeding from a mid-line Y of the connecting webs 11. The width of the edge sections 4b and 4c each amounts preferably to one sixth to one-fourth, quite preferably one-fifth, of the total width of the holding teeth 4, and the perimeter width of the middle sections 4a each amounts preferably to four-sixths to two-fourths, quite preferably three-fifths, of the total width of the holding teeth 4.

According to the invention, the slots 6 each emanate from one of the punch-outs 9. But a slot 6 need not connect to every punch-out 9. The punch-outs 9 in which the slots 6 end, have a smaller perimeter width than the other punch-outs 9 to form the connecting webs 11, which is derived from the above dimensions for the width of the middle sections 4a and/or edge sections 4b and 4c of the holding teeth 4.

Due to the connecting of the holding teeth 4 by means of the connecting webs 11, the elasticity of the holding teeth 4 is increased, in comparison to a non-interrupted connection between the holding teeth 4 and the intermediate section 7, that is, a full-surface connection of the holding teeth 4.

Additionally, FIG. 1 schematically depicts the circular-shaped mid-line K at a punch-out 9 as a section from a complete arc, which can form the mid-line K for all punch-outs 9 of all design embodiments. Likewise, a radial offset of the punch-outs 9 to each other is possible.

Figure 3:
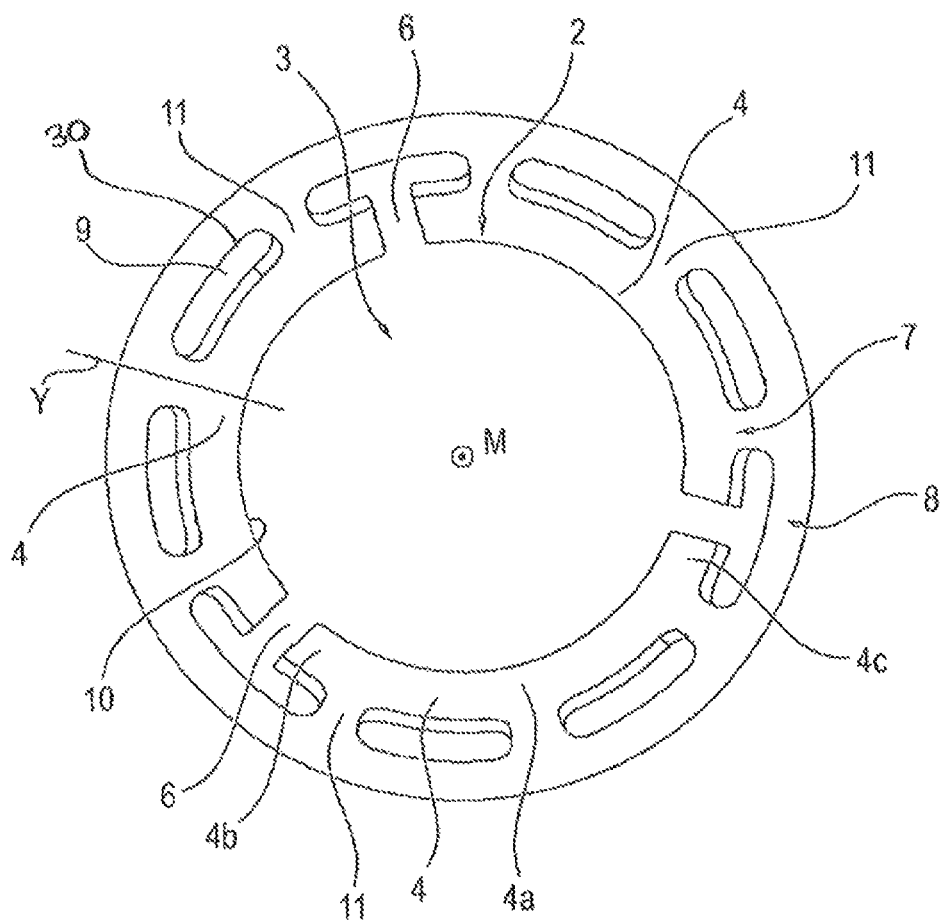
FIG. 3 is a schematic, front view of an alternative toothed gear according to the principles of the present invention, with three holding teeth.
Figure 4:
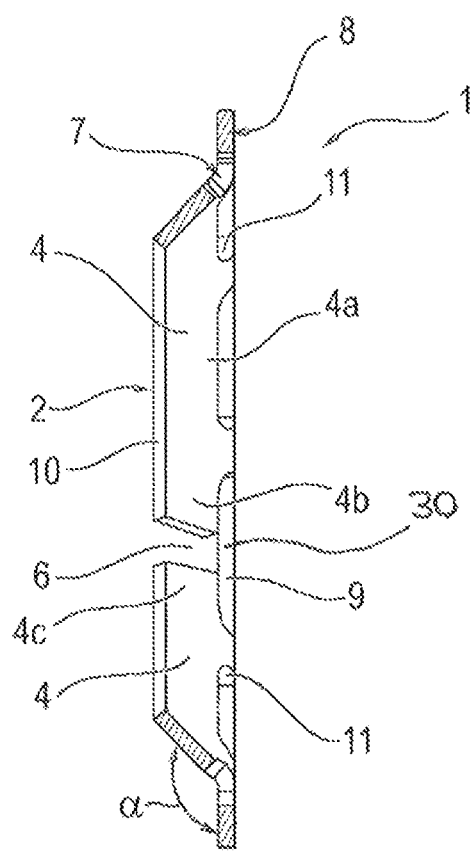
FIG. 4 is a cross-section of the toothed disk according to FIG. 3.

FIGS. 3 and 4 depict a design of a toothed disk 1 according to the principles of the present invention, with three holding teeth 4, which are each connected by means of three connecting webs 11 to the mounting section 8. Thus, the width of the edge sections 4b and 4c according to the invention, which end at the slots 6, amounts to, for example, one-sixth of the total perimeter width of the holding teeth 4, and the middle section 4a located between the edge sections 4b and 4c has a width of four-sixths of the total width of the holding tooth. In this design the punch-outs 9 are created such that they have the same perimeter width and the outward arranged connecting webs 11 have the same distance to the third connecting web 11 disposed between them. As regards the dimensioning of the invented toothed disk 1 in this design embodiment, we refer to the above description, so that the dimensions and size relationships stated therein likewise apply to the individual features of the toothed disk 1 according to the invention.

For the design of a toothed disk 1 according to the principles of the present invention it is essential that the holding teeth 4 are dimensioned such that their end edges 10 in the corner region of the edge sections 4b, 4c have a depth of penetration into the inserted and fastened media line, when under load, wherein each end edge 10 penetrates to such a depth that the holding tooth 4 with its end edge 10 features a single wrapping angle, in which its contact surface with fastening function amounts to between 55° and 105° of a maximum wrapping angle of 360°, wherein the individual wrapping angle decreases with the increasing number of holding teeth.

Figure 5:
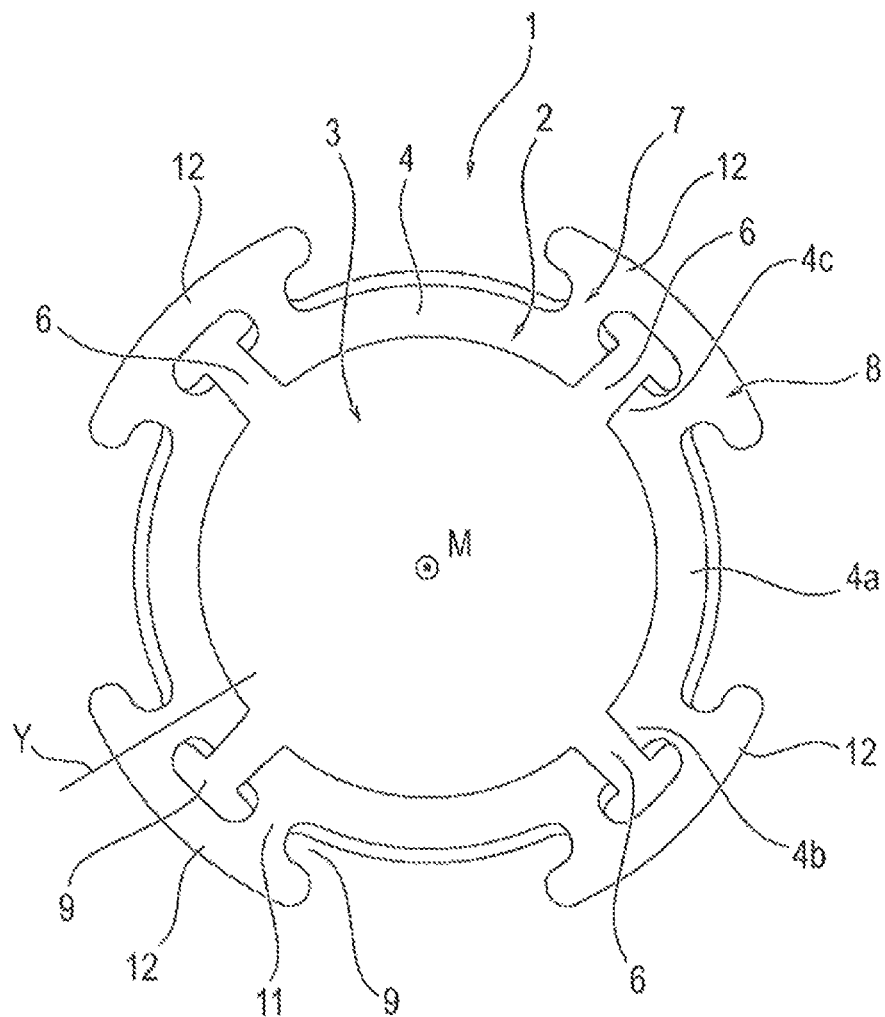
FIG. 5 is a schematic, front view of another, alternative toothed disk according to principles of the present invention, with a mounting section composed of four ring segments.
Figure 6:
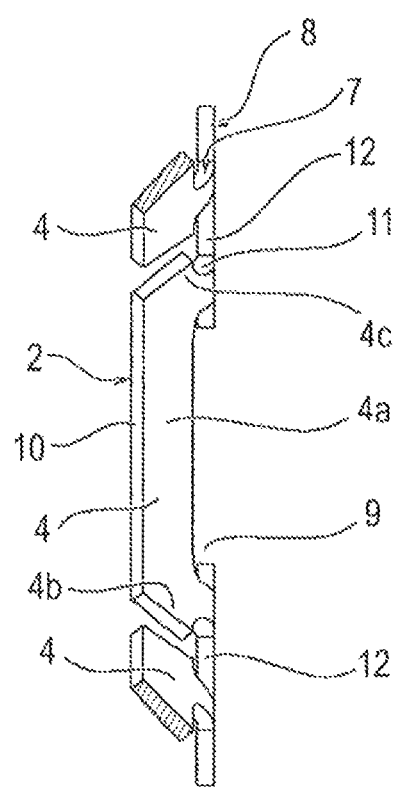
FIG. 6 is a cross-section of the toothed disk according to FIG. 5.

FIGS. 5 and 6 depict an additional design embodiment of a toothed disk 1 according to the principles of the present invention. As regards the design of this toothed disk 1, with respect to its individual design features and dimensions and size relationships, it can be designed like that described in FIGS. 1 to 4 accordingly. But the difference here is that the outer mounting section 8 is not designed as an enclosed ring, as depicted in FIGS. 1 and 4, but rather the mounting section 8 is formed from at least three equally spaced ring segments 12, which each connect the connecting webs 11 adjoining the slots 6. FIGS. 5 and 6 depict four ring segments 12 designed as being equally spaced from each other. Thus, in this design embodiment, the punch-outs 9 located between the outer connecting webs 11, also comprise the region of the mounting section 8.

The slots 6 are designed preferably as radial punch-outs with material removal.

Figure 7:
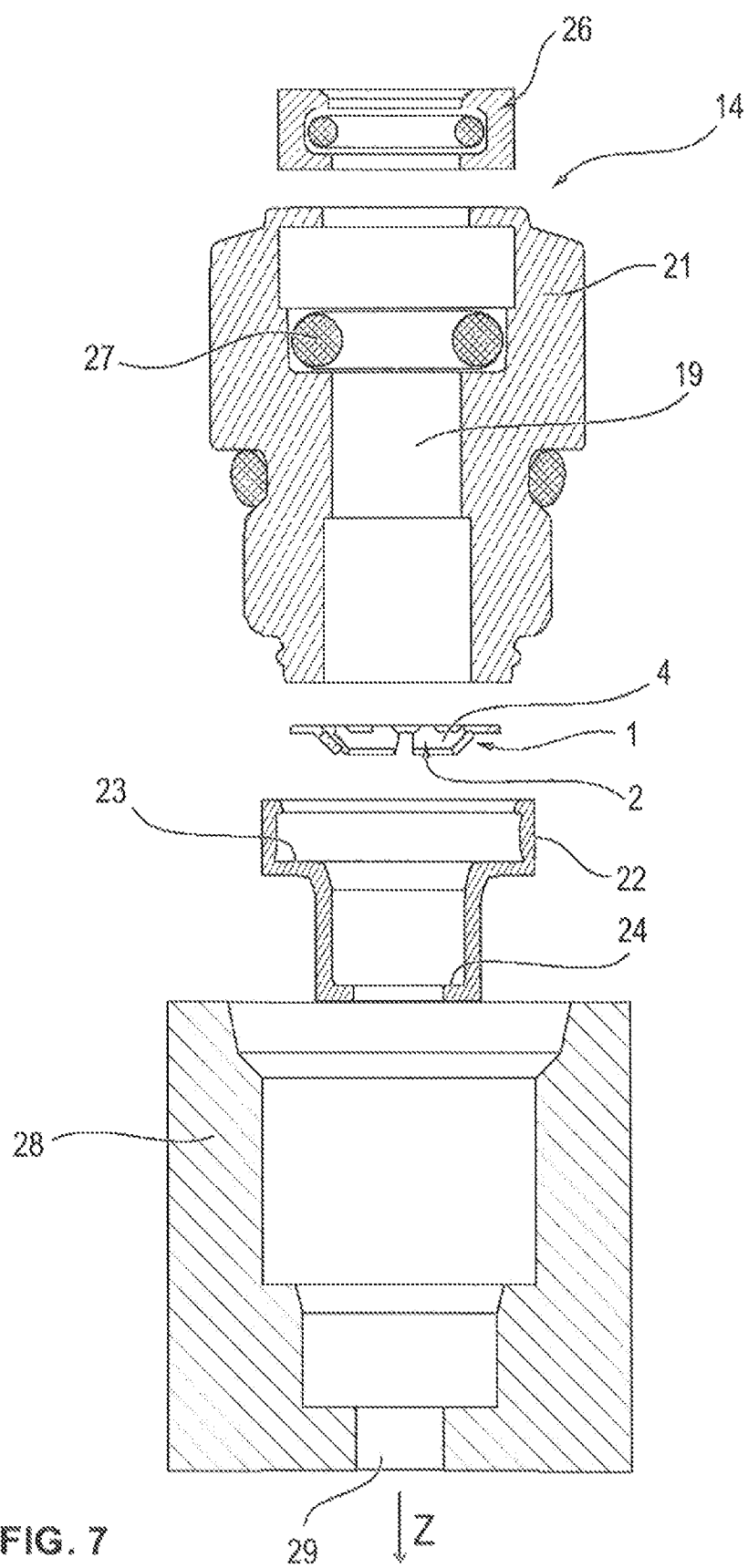
FIG. 7 is an exploded representation of a connecting arrangement with the toothed disk according to the principles of the present invention.
Figure 8:
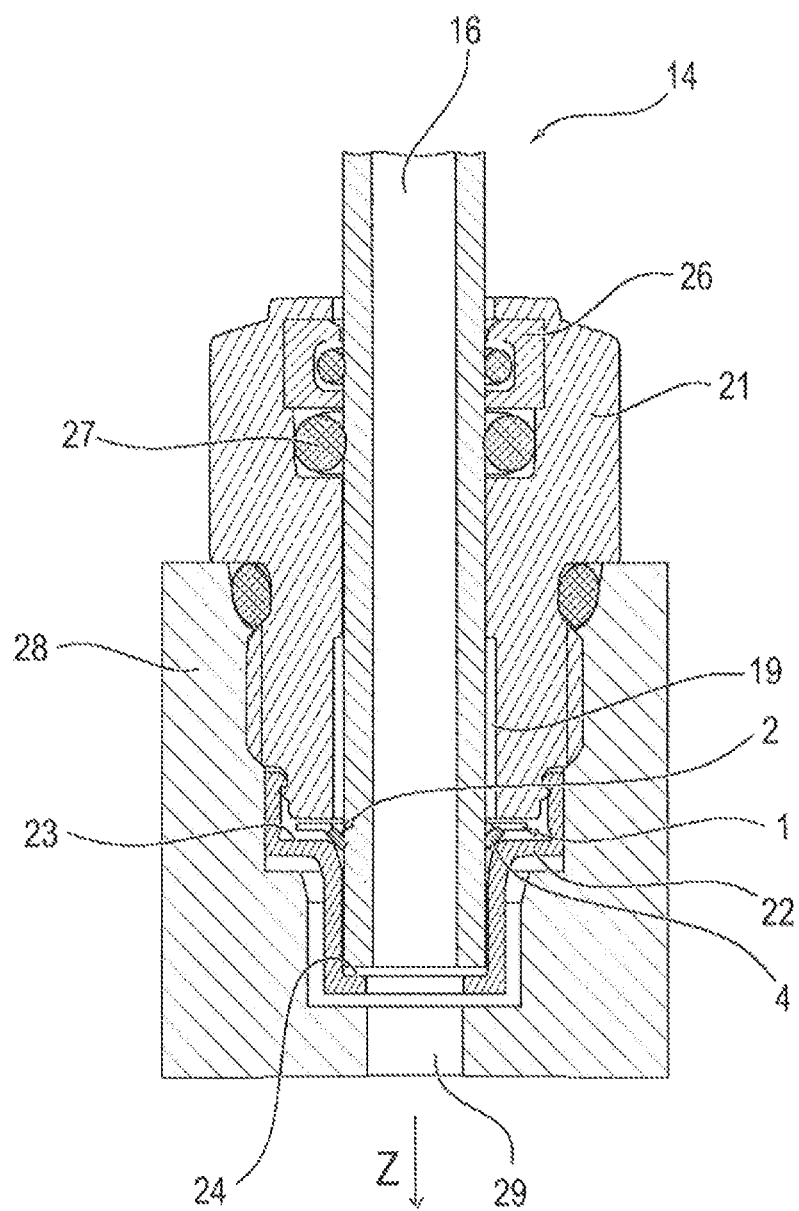
FIG. 8 is the connecting arrangement according to FIG. 7 in an assembled state.

FIGS. 7 and 8 depict one possible design of a connecting arrangement 14 for feedthrough plug-connecting of a media line 16 which uses the toothed disk 1 according to the principles of the present invention. The media line 16 penetrates a feedthrough opening 19 of a cap screw 21, in the insertion direction Z, up to a contact bushing 22 arranged at the end of the cap screw 21. The toothed disk 1 is arranged between the aforesaid end of the cap screw 21 and a circular-shaped support lug 23 of the contact bushing 22. In the inserted state of the media line 16, the holding teeth 4 of the inner holding section 2 engage into an outer mantle surface of the media line 16, so that the media line 16 is prevented from axial displacement opposite the insertion direction Z. In addition, the media line 16 is secured against axial displacement along the insertion direction Z due to a circular-shaped abutment lug 24 arranged on front of the contact bushing 22. On its end away from the insertion direction Z, the cap screw 21 features a radial gasket arrangement 26 with an O-ring arrangement 27 in order to prevent leakage of media at the prevailing system pressure. The cap screw 21 is connected to a receiving tube 28. According to a preferred embodiment depicted in FIGS. 7 and 8, the cap screw 21 is screwed by means of an outer threading to an inner threading of the receiving tube 28. Finally, the receiving tube 28 features a receiving opening 29 disposed coaxially to the media line 16 and to the feedthrough opening 19 of the cap screw 21.

Thus the embodiment according to FIGS. 7 and 8 comprise a connecting arrangement without a spindle, wherein the connection is assured according to the "seal before hold"-principle, that is, the toothed disk 1 lies behind the sealing region in the insertion direction Z. Alternatively it is possible—although not illustrated—to implement a connection using the "hold before seal"-principle, wherein the toothed disk 1 lies before the sealing region in the insertion direction Z.

Figure 9:
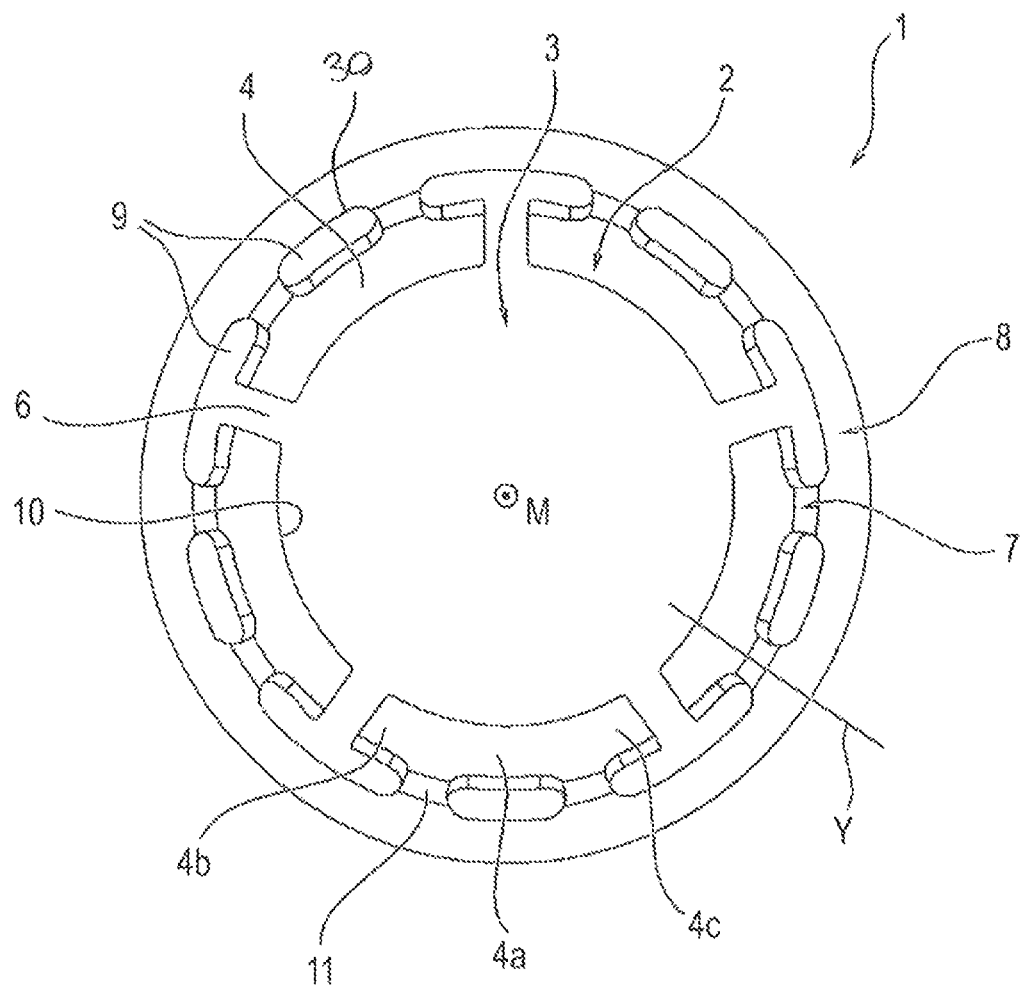
FIG. 9 is a schematic, front view of an alternative toothed gear according to the principles of the present invention, with five holding teeth.
Figure 10:
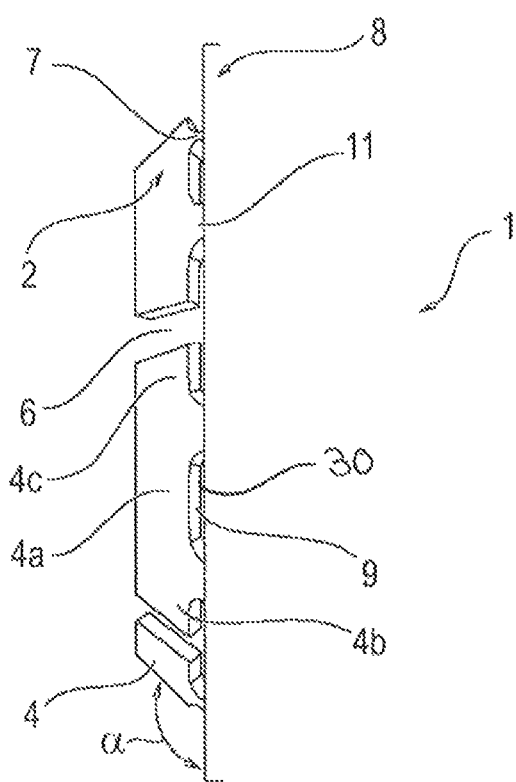
FIG. 10 is a side view of the toothed disk according to FIG. 9.

FIGS. 9 and 10 depict an alternative embodiment of the invented toothed disk 1, with a total of five holding teeth 4, wherein the punch-outs 9 into which no slot 6 opens, each feature a smaller perimeter width than the punch-outs 9 into which a slot 6 does open.

The invention is not limited to the illustrated and described embodiments, but rather encompasses also all designs which are equivalent within the sense of the invention. It is expressly emphasized that the exemplary embodiments are not limited to all features in combination, rather, each individual part feature can by itself also have inventive significance even detached from all other part features. Furthermore, the invention is also not limited to the combination of features defined in claim 1, but rather can also be defined by any other particular combination of specific features of all the disclosed individual features. This means that basically virtually each individual feature of claim 1 can be omitted and/or replaced by at least one individual feature disclosed elsewhere in the application.

The invention claimed is:

1. A toothed disk for fastening a media line, said disk having a circular insertion opening, wherein at a periphery of the insertion opening, spring elastic holding teeth are arranged and separated from each other by respective slots, the holding teeth forming an inner holding section, wherein in the axial direction the holding teeth extend at an angle to a longitudinal axis extending perpendicularly to a circle plane through a center point of the insertion opening in such a way that said holding teeth define an obtuse angle together with a mounting section, wherein each holding tooth of the inner holding section is connected to the mounting section by at least two connecting webs that form an intermediate section connecting the inner holding section and the mounting section, the connecting webs are formed between adjacent circular arc-shaped punch-outs extending in the perimeter direction, the punch-outs lie on an arc-shaped center line on a circle concentric to the insertion opening, wherein each of the holding teeth features a middle section and edge sections, the middle sections being disposed between the connecting webs and the edge sections extending from the middle sections in a direction toward the slots over the webs and ending at the slots, each slot emanating from one of the punch-outs.

2. The toothed disk according to claim 1, wherein the toothed disk has an intended media line size and the holding teeth together form a perimeter wrapping angle defined as at least 70% of a maximum wrapping angle of 360 degrees.

3. The toothed disk according to claim 1, wherein the inner holding section features three to six holding teeth.

4. The toothed disk according to claim 1, wherein all of the holding teeth have the same dimensions.

5. The toothed disk according to claim 1, wherein the perimeter width of the middle sections and edge sections are dimensioned and defined proceeding from a center line of the connecting webs and wherein the width of the edge sections is in the range of one-sixth to one-fourth of a total width of the holding teeth, and wherein the perimeter width of the middle sections is in the range of four-sixths to two-fourths of the total width of the holding teeth.

6. The toothed disk according to claim 5, wherein the width of the edge sections are one-fifth of the total width of the holding teeth.

7. The toothed disk according to claim 1, wherein the toothed disk is formed as a punched, spring elastic component and if formed of a spring elastic material.

8. The toothed disk according to claim 7, wherein the spring elastic material has a material thickness in the range of 0.1 mm to 0.4 mm.

9. The toothed disk according to claim 7, wherein the width of the connecting webs measured in the perimeter direction is in the range of two-times to three-times the material thickness of the used material of the toothed disk.

10. The toothed disk according to claim 7, wherein the spring elastic material has a material thickness in the range of 0.2 mm to 0.25 mm.

11. The toothed disk according to claim 1, wherein the mounting section features a radial width in the range of two-times to four-times the material thickness.

12. The toothed disk according to claim 1, wherein the obtuse angle is in the range of 120° to 150°.

13. The toothed disk according to claim 1, wherein the slots have a perimeter width in the range of 0.15 mm to 0.4 mm.

14. The toothed disk according to claim 1, wherein the ones of the punch-outs from which the slots emanate have a smaller perimeter width than the other punch-outs not having slots emanating therefrom.

15. The toothed disk according to claim 1, wherein all of the punch-outs have the same perimeter width.

16. The toothed disk according to claim 1, wherein the mounting section is formed from at least three equally spaced ring segments, each of the ring segments being connected to two of the webs adjoining the slots.

17. The toothed disk according to claim 1, wherein the toothed disk has an intended media line size and the insertion opening defines a diameter after the punching and before the bending that is 5 to 15% smaller than an outside diameter of the intended media line size.

18. The toothed disk according to claim 1, wherein the toothed disk has an intended media line size and the insertion opening defines a diameter after the bending of the holding teeth that is smaller than an outside diameter of the intended media line size and is in the range of 2% to 10% greater than a diameter of the insertion opening before the bending of the holding teeth.

19. The toothed disk according to claim 1, wherein each holding tooth includes an end edge in a corner region of the edge sections configured to penetrate under load to a penetration depth into the media line such that each of the holding teeth with its end edge defines a single wrapping angle is in the range of 55° to 105° of a maximum wrapping angle of 360°.

20. The toothed disk according to claim 1, wherein the slots are radial punch-outs with material removal.

21. The toothed disk according to claim 1, wherein the mounting section is an enclosed ring.

22. The toothed disk according to claim 1, wherein each holding tooth defines part of an enclosed perimeter punch-out, wherein the enclosed perimeter punch-out is wrapped by an angle of 360 degrees at an edge defining the enclosed punch-out.

23. The toothed disk according to claim 22, wherein the edge defining enclosing the punch-out along the perimeter at an angle of 360 degrees is formed exclusively by the holding tooth, two of the connecting webs and the mounting section.

24. The toothed disk according to claim 1 incorporated as an ensemble with a connecting arrangement for feedthrough plug-connecting of a media line, the connecting arrangement comprising a cap screw configured to be penetrated by the media line along a pass-through opening, wherein the cap screw is connected in one insertion direction frontally to a contact bushing and to a receiving tube, wherein the cap screw features a radial gasket arrangement at its rear end in the insertion direction, and wherein the toothed disk is disposed coaxially between the front end of the cap screw in the insertion direction and the contact bushing.

25. The toothed disk according to claim 1, wherein the toothed disk has an intended media line size and the holding teeth together form a perimeter wrapping angle defined as 75% to 95% of a perimeter of the intended media line size.

26. The toothed disk according to claim 1, wherein the mounting section has a radial width in the range of 0.5 mm to 1.0 mm.

27. The toothed disk according to claim 1, wherein the obtuse angle is in the range of 130° to 140°.

* * * * *